United States Patent [19]

Klein

[11] 4,399,711

[45] Aug. 23, 1983

[54] METHOD AND APPARATUS ENSURING FULL VOLUME PICKUP IN AN AUTOMATED PIPETTE

[75] Inventor: Gerald L. Klein, Orange, Calif.

[73] Assignee: Beckman Instruments, Inc., Fullerton, Calif.

[21] Appl. No.: 141,725

[22] Filed: Apr. 18, 1980

[51] Int. Cl.³ .................... G01N 1/10; G01N 21/27

[52] U.S. Cl. .................... 73/864.16; 250/577; 422/64; 422/100; 356/341

[58] Field of Search .......... 73/425.4 P, 425.6, 864.16, 73/864.13, 864.11; 422/100; 141/27, 90; 250/576, 577

[56] References Cited

U.S. PATENT DOCUMENTS

| | | | |
|---|---|---|---|
| 2,771,217 | 11/1956 | Brown et al. | 73/864.16 X |
| 3,137,172 | 6/1964 | Harrison | 73/425.4 R |
| 3,143,393 | 8/1964 | De Sequin Des Hons | 73/864.11 X |
| 3,188,181 | 6/1965 | Peterson et al. | 73/425.4 R X |
| 3,437,447 | 4/1969 | Harmon | 73/425.4 R X |
| 3,498,135 | 3/1970 | Seitz et al. | 73/425.6 |
| 3,536,449 | 10/1970 | Astle | 73/425.4 P |
| 3,596,673 | 8/1971 | Laucournet | 222/21 X |
| 3,604,267 | 9/1971 | Johns | 422/100 X |
| 3,607,094 | 9/1971 | Lidingo | 141/105 X |
| 3,609,379 | 9/1971 | Hildebrandt | 222/52 X |
| 3,615,230 | 10/1971 | Barnick et al. | 141/130 X |
| 3,687,632 | 8/1972 | Natelson | 73/425.6 X |
| 3,759,667 | 9/1973 | Bannister et al. | 422/100 X |
| 3,812,482 | 5/1974 | Clark | 356/341 X |
| 3,831,618 | 8/1974 | Liston | 73/423 A X |
| 3,908,129 | 9/1975 | Akers | 250/577 |
| 3,951,605 | 4/1976 | Natelson | 73/423 A X |
| 4,076,503 | 2/1978 | Atwood et al. | 422/100 |
| 4,130,394 | 12/1978 | Negersmith | 23/230 R |
| 4,157,871 | 6/1979 | Anderson et al. | 356/341 |
| 4,244,919 | 1/1981 | Chen | 422/100 |
| 4,298,570 | 11/1981 | Lillig et al. | 422/64 |

*Primary Examiner*—Daniel M. Yasich
*Attorney, Agent, or Firm*—R. J. Steinmeyer; J. E. Vanderburgh; Timothy R. Schulte

[57] ABSTRACT

An automated pipette employing a device to ensure exact volume pickup and delivery. An optical device senses the presence of a liquid in the tip of the pipette. By intaking the volume past the optical device stream continuity is determined.

4 Claims, 2 Drawing Figures

METHOD AND APPARATUS ENSURING FULL VOLUME PICKUP IN AN AUTOMATED PIPETTE

BACKGROUND OF THE INVENTION

1. Field of the Invention

The invention relates to the field of automated pipettes. In still greater particularity the invention relates to an automated pipette employing a device to ensure full volume pickup. By way of further characterization but not by way of limitation thereto, the invention is an automated pipette with optical detectors to sense the presence of a liquid within the pipette.

2. Description of the Related Art

Many measuring and testing instruments as, for example, immunonephelometric instruments such as that described in U.S. Pat. No. 4,157,871 issued on June 12, 1979, require successive manipulations of the sample substance to be tested. These manipulations consume a great deal of operator time when a number of assays on many samples are performed. To obtain good results, an operator must repeat a number of steps in the proper sequence for each sample. Manual pipetting steps include the identification of a number of samples and may require exact volume pickup. Because the sample manipulations are usually done by hand, operator fatigue and boredom too often result in erroneous results. Additionally, the reduction in operator morale due to fatigue and boredom generally contributes to a decrease in job performance resulting in increased operating costs for the laboratory. In addition, where exact volumes are required to be used, operator error, however slight, may cause inconsistent or erroneous results.

Of major importance in sample handling technique is preciseness in the amount of substance, either sample, diluent, or reagent which must be taken to assure accurate, reproducible results. Failure in sample quantity preciseness can become a major problem in any assay protocol. This problem may occur during manual as well as automated sample handling. For example, an operator, during manual pipetteting, may take slightly more or less of the substance than is required. Reading of the meniscus, tilting of the pipette, and similar factors may result in measuring errors. Accuracy thus depends on the degree of intuitive skill or carefulness of the operator. With an automated pipette the motions of the hardware are very well defined and volume displacement is standardized to avoid careless errors. However, the accuracy of incremental measurements depends upon transferring exact volumes and it is important to know that the desired volume has been transferred. With robot motions of a pipette the depth of penetration into the liquid container is well defined. However, if the solution level drops below the pickup tip position, it is possible to pick up an incomplete volume. During manual operation a technician may lower the tip further to pick up a greater volume. In an automated system a robot cannot easily make this decision.

SUMMARY OF THE INVENTION

The invention is an automated pipette which includes an apparatus for assuring full volume pickup of the desired liquid. A device for propagating an electromagnetic signal is mounted adjacent the tip portion of the automatic pipette. A device for detecting the propagated electromagnetic signal is mounted adjacent the tip opposite to the source of the signal. The propagated signal must thus pass through the tip portion before being detected. The difference in refractive indices of various substances is utilized to determine the presence of a substance in the tip portion. That is, critical angle reflections due to the passage of the electromagnetic signal from a material having one index of refraction to a material having a different index of refraction allows the determination of the presence of a substance within the tip portion. A qualitative measure of the presence or absence of the substance in the tip portion is thus available. Because the geometric configuration of the automated pipette is known, the presence of a substance in the tip portion after the substance has been drawn into the automated pipette indicates that a minimum desired amount of the substance is present in the automated pipette. A full, precise volume pickup is thus assured for delivery to a desired location.

DESCRIPTION OF THE PREFERRED EMBODIMENT

Figure 1:
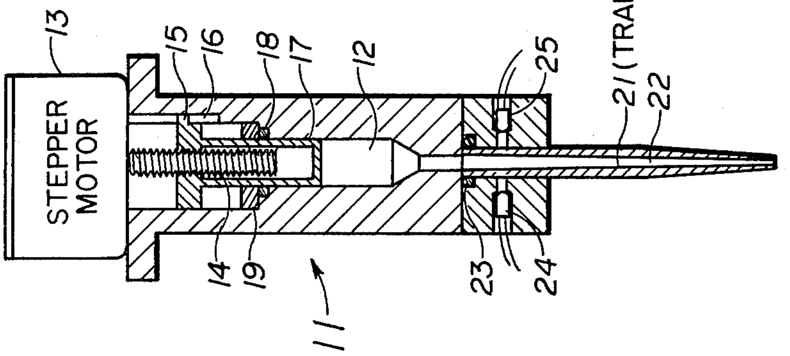
FIG. 1 is a side sectional view of an automated pipette.

Referring to FIG. 1, an automated pipette generally designated as 11 is shown. Automated pipette 11 includes a hollow body portion 12. A stepper motor 13 has attached thereto a lead screw 14. A drive nut 15 has an anti-rotation key 16 and engages lead screw 14. A piston 17 is attached to drive nut 15 so as to be moved by rotation of lead screw 14. Lead screw 14 may telescope into hollow piston 17. A piston seal 18 and retainer 19 define an interior space having known volume.

A removable tip portion 21 having a conduit 22 extending axially therethrough communicates with hollow body portion 12. A tip seal 23 secures removable tip portion 21 to hollow body portion 12. Hollow body portion 12 is transparent in the area adjacent a volume determining means which may include a means for propagating an electromagnetic signal and a means for detecting that electromagnetic signal. The propagating means may include a light emitting diode (LED) 24 and the detecting means may include a phototransistor 25.

Referring to FIGS. *2a–g*, automated pipette 11 is shown simplistically for ease of illustration. Pipette 11 in FIGS. *2a–g* is actually the same as pipette 11 in FIG. 1. FIGS. *2a–g* illustrate the steps necessary to assure full volume pickup of a liquid 26 from a first container 27 and accurate volume delivery to a second container 28. Pipette 11 is moved vertically and horizontally by conventional apparatus (not shown) such as that disclosed in U.S. Pat. No. 4,298,570.

MODE OF OPERATION

Automated pipette 11 is provided with a determining means which includes LED 24 and phototransistor 25. The principle of operation for the determining means is that the presence or absence of fluid in conduit 22 results in a change in the amount of energy received by phototransistor 25 from LED 24. When conduit 24 is unfilled the energy received by phototransistor 25 is relatively low. When conduit 22 is filled the energy received is high. This is due to critical angle reflections through the transparent material which makes up tip portion 21. The critical angle differential due to a difference in indices of refraction across the boundary between materials causes the high to low change. Air is assumed to have a refractive index of 1.0, water 1.333 and most construction materials for tip portion 21 have indices of refraction near 1.50. The difference between air and tip will thus be 0.5 which means that the electromagnetic beam from LED 24 will be largely reflected away from phototransistor 25. When conduit 22 is filled with fluid, typically aqueous, the refractive index differential is 0.17 and less of the beam is diverged away from phototransistor 25. This permits a qualitative measure of presence or absence of fluid in conduit 22. From the geometry of tip portion 21 and body portion 12 the quantity of liquid that can be contained above and below the crossing light beam is known.

Figure 2:
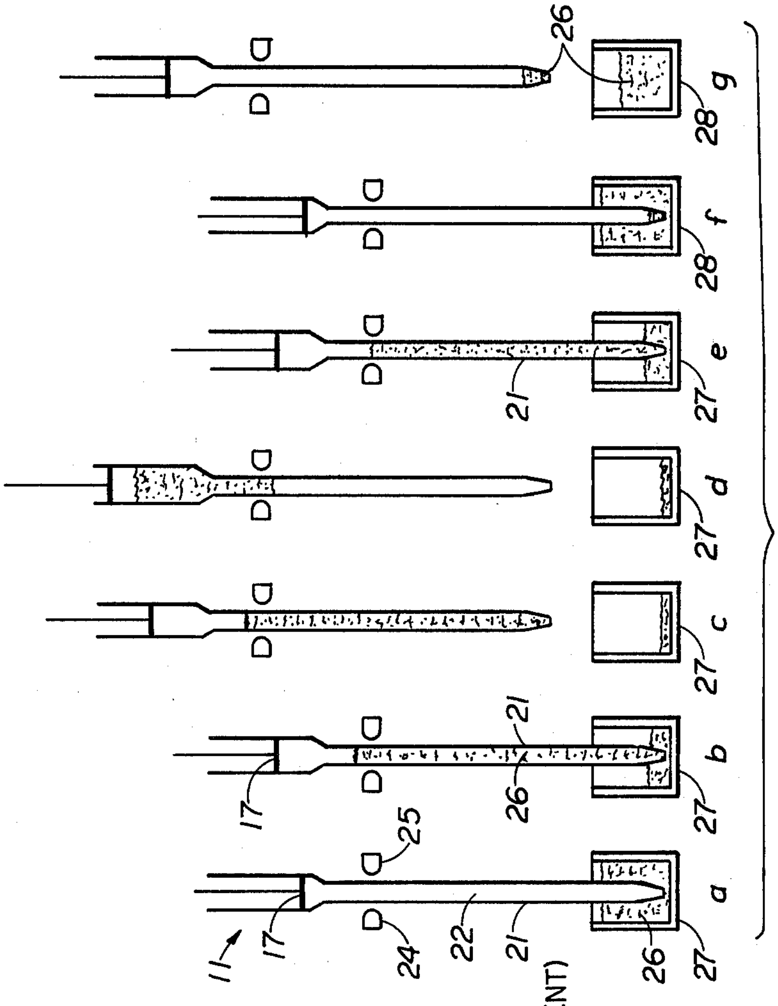
FIG. 2 is a sequential operational view of a method for assuring full volume pickup.

Referring to FIGS. 2*a* to *g*, the operation of automated pipette 11 and the accompanying determining means is as follows. Referring to FIG. 2*a*, tip portion 21 is immersed in liquid 26 in cup 27. Referring to FIG. 2*b*, the volume of liquid 26 desired is drawn up by piston 17 along with a small amount of excess liquid. The amount of excess liquid taken is determined by system tolerances. That is, the excess amount serves to compensate for system backlash and uncertainty in the read line between LED 24 and phototransistor 25.

Referring to FIG. 2*c*, tip portion 21 is retracted from the solution. Referring to FIG. 2*d*, a volume, equal to the volume desired plus half of the excess liquid taken, is drawn up into hollow body portion 12 by piston 17. If, during the intake, the signal to phototransistor 25 remains high, then the fluid column is continuous and at least the desired volume has been drawn into automated pipette 11. If, for some reason, less than the desired amount was taken in, then air would have passed by phototransistor 25 during the intake and the signal would be low. Stream continuity is thus assured.

Referring to FIG. 2*e*, automated pipette is lowered back into well 27 and the desired amount plus about half of the excess amount is put back into tip portion 21 to reset piston 17. The other half of the excess is expelled into well 27 to prevent an air volume from remaining at the end of conduit 22. Referring to FIG. 2*f*, automated pipette 11 is moved and tip portion 21 is lowered into empty well 28. The desired exact volume of substance is then dispensed into well 28. Referring to FIG. 2*g*, automated pipette 11 is now retracted and the small volume (approximately half of the excess taken in) of remaining excess liquid is disposed of in a suitable receptacle and the pipette is washed.

The pickup of the excess volume is required. Due to systematic tolerances and backlash it is otherwise impossible to operate on an exact volume. Assuming that the system has been "proved" before initiation of the sequence in that the direction of pickup is already established and backlash taken up then, during intake the desired volume and excess will be drawn into conduit 22. During the second intake in FIG. 2*d* the fluid column will follow further up tip portion 21 being followed by air. If phototransistor 25 senses any discontinuity during the second intake, then the volume contained is less than the desired volume. The determining means thus functions to sense stream continuity rather than a specific volume.

At the beginning of dispensing there is an uncertainty as to when the motion of piston 17 begins due to clearances between drive nut 15, lead screw 14, and antirotation key 16 with its keyway. This is termed backlash. However, the step of pumping out half the excess illustrated in FIG. 2*e* will ensure that tip portion 21 still contains slightly more than the desired volume to dispense and the direction of travel of piston 17 will then be set to delivery without backlash.

The exact desired volume may be delivered as shown in FIG. 2*f*.

In the preferred embodiment, that is, when pipette 11 is used with a nephelometer, it is desired to pick up and deliver 42 microliters of liquid for sample testing. Thus 50 microliters of liquid 26 is drawn into conduit 22 (FIG. 2*b*), representing the 42 microliters desired plus 8 microliters excess. Stream continuity is then sensed (FIGS. 2*c* and *d*). Four microliters (one-half of the excess) are put back into well 27 to reset any backlash in the automated pipette mechanism (FIG. 2*e*). Automated pipette 11 rises out of well 27 and moves to reaction cell 28. Automated pipette 11 lowers and delivers 42 microliters of liquid 26 into reaction cell 28 (FIG. 2*f*) and then withdraws (FIG. 2*g*), moving to a wash station where any remaining excess liquid is disposed of.

While particular forms of the invention have been disclosed with respect to a preferred embodiment thereof, it is not to be so limited as changes and modifications may be made without departing from the scope of the invention. For example, while the invention has been disclosed as employed with a nephelometer, it may be advantageously employed with other testing apparatus. Any testing apparatus requiring exact volume pickup and delivery of a liquid could advantageously employ this invention. The amount of excess liquid taken depends to a large extent on system tolerances and thus may vary in different systems and applications. Conductivity probes or the like could be used to sense stream continuity instead of the optical sensors disclosed.

The foregoing description, taken together with the appended claims, constitutes a disclosure which enables one skilled in the art and having the benefit of the teachings contained therein to make and use the invention. Further, the structure herein described constitutes a meritorious advance in the art which is unobvious to such skilled workers not having the benefit of these teachings.

What is claimed is:

1. A method for ensuring pickup and delivery of a desired volume of a liquid from a first container to a second container by an automated pipette structure having a tip portion mounted at the bottom thereof comprising the steps of:

drawing said desired volume of liquid plus a predetermined amount of excess liquid from said first container into the tip portion of said automated pipette by means of a piston selectively controlled in an automatic manner by means mounted on said automatic pipette structure;

retracting said automated pipette from said liquid in said first container;

intaking said drawn volume past an electromagnetic sensor;

sensing the continuity of said drawn volume by electromagnetically detecting the continued presence of said drawn volume as it is being intaken past said electromagnetic sensor mounted adjacent said tip portion;

automatically lowering said automated pipette into said first container;

returning said drawn volume to said tip portion of said automated pipette;

expelling a portion of said excess liquid concurrently with said step of returning; and delivering said desired volume to said second container.

2. A pipette comprising:

a hollow body portion defining an interior space of known volume;

means, associated with said pipette, for selectively moving said pipette vertically and horizontally from one container to another in an automatic manner;

a removable tip portion at the bottom of said hollow body portion and sealably secured to said body portion, said tip portion including a conduit extending axially therethrough, said conduit communicating with said interior space;

a piston portion movably mounted in said interior space of said hollow body portion;

a stepper motor threadably engaged with said piston portion and mounted on top of said hollow body portion;

sensor means, mounted adjacent said tip portion, for propagating an electromagnetic signal through said tip portion; and means, mounted adjacent said tip portion, for detecting said propogated electromagnetic signal which has passed through said tip portion and said conduit.

3. Device according to claim 2 wherein said propagating means includes a light emitting diode.

4. Device according to claim 2 wherein said detecting means includes a phototransistor.

* * * * *